(12) United States Patent
Kawana

(10) Patent No.: US 8,531,712 B2
(45) Date of Patent: Sep. 10, 2013

(54) IMAGE FORMING APPARATUS AND CONTROL METHOD THEREOF

(75) Inventor: Yoshimasa Kawana, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 13/227,720

(22) Filed: Sep. 8, 2011

(65) Prior Publication Data

US 2012/0069392 A1 Mar. 22, 2012

(30) Foreign Application Priority Data

Sep. 16, 2010 (JP) ................................. 2010-207892

(51) Int. Cl.
*G06F 15/00* (2006.01)

(52) U.S. Cl.
USPC ........ 358/1.15; 358/1.13; 358/1.14; 709/217; 709/224

(58) Field of Classification Search
None
See application file for complete search history.

(56) References Cited

U.S. PATENT DOCUMENTS

2007/0294228 A1* 12/2007 Kawana ........................... 707/3

FOREIGN PATENT DOCUMENTS

JP 10-304005 A 11/1998

* cited by examiner

*Primary Examiner* — Twyler Haskins
*Assistant Examiner* — Helen Q Zong
(74) *Attorney, Agent, or Firm* — Canon USA, Inc., IP Division

(57) ABSTRACT

An image forming apparatus of the present invention returns a response indicating that the image forming apparatus includes a function for changing information of a sending destination to a monitoring apparatus to an inquiry from the monitoring apparatus when it is determined that the image forming apparatus includes the function for changing the information of the sending destination of the monitoring information and monitoring has not been performed by a different monitoring apparatus. The image forming apparatus further receives a request for changing the information of the sending destination from the monitoring apparatus to change the sending destination of the monitoring information to the sending destination of the monitoring apparatus.

8 Claims, 11 Drawing Sheets

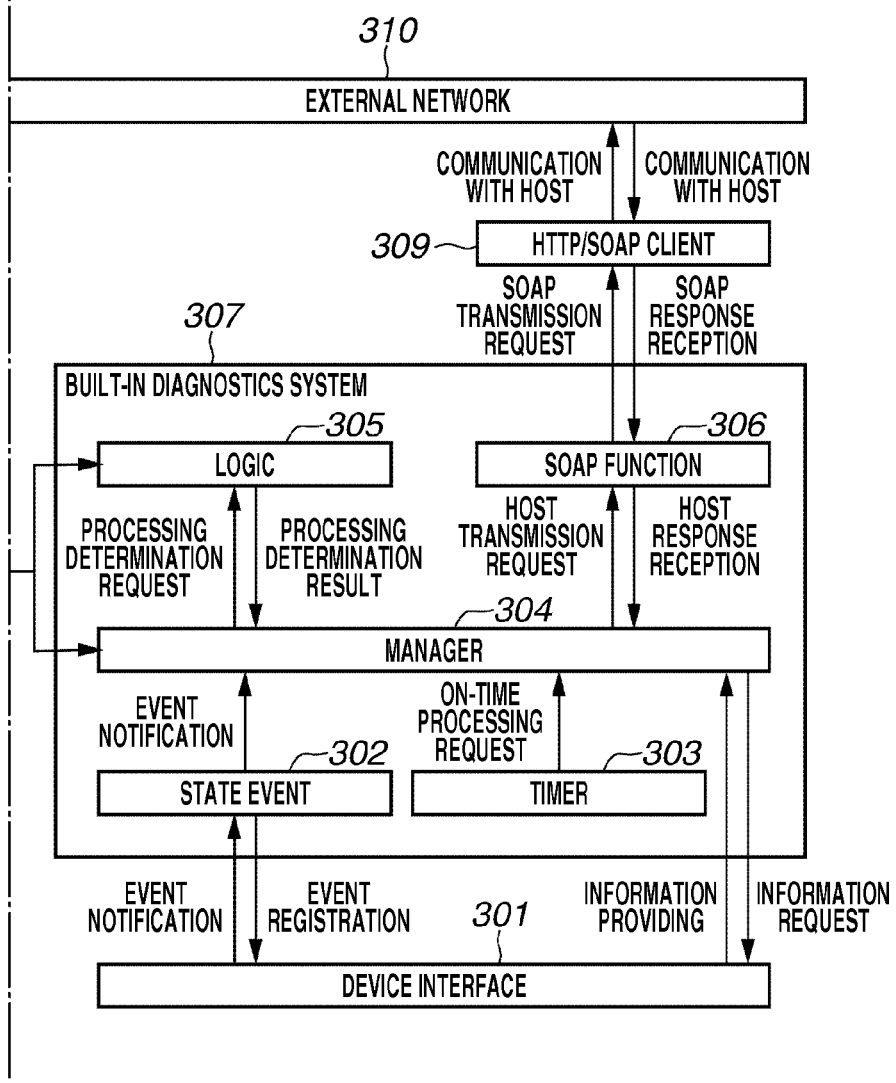

FIG.4

| ITEM NAME | VALUE |
|---|---|
| DEVICE IDENTIFICATION NUMBER | A01234567 |
| MONITORING PROGRAM VERSION | Ver 3.41 |
| SELF-MONITORING FUNCTION | AVAILABLE |
| MONITORING MODE | SPECIAL MONITORING MODE |
| SENDING DESTINATION URL | https://master-server/gateway |
| SENDING DESTINATION URL CHANGE FUNCTION | AVAILABLE |
| SETTING CHANGE Web Service URL | https://local-device/web-service |

FIG.5

| SNMP OID | INFORMATION |
|---|---|
| Web Service NAME | SETTING CHANGE Web Service |
| Web Service URL | https://local-device/web-service |
| Web Service State | ON |

FIG.8

| TYPE OF COMMUNICATION USED IN MONITORING | TYPE OF AVAILABLE COMMUNICATION DEVICE |
|---|---|
| NON | POLLING/DIRECT TRANSMISSION FUNCTION/INDIRECT TRANSMISSION FUNCTION |
| POLLING | DIRECT TRANSMISSION FUNCTION/INDIRECT TRANSMISSION FUNCTION |
| DIRECT TRANSMISSION | INDIRECT TRANSMISSION FUNCTION |
| SPECIAL TRANSMISSION | NON |
| INDIRECT TRANSMISSION | INDIRECT TRANSMISSION FUNCTION |

FIG.9

| SNMP OID | INFORMATION |
|---|---|
| MONITORING STATE | IN MONITORING |
| COMMUNICATION TYPE IN MONITORING | POLLING |
| AVAILABLE COMMUNICATION FUNCTION | DIRECT TRANSMISSION FUNCTION/INDIRECT TRANSMISSION FUNCTION |

IMAGE FORMING APPARATUS AND CONTROL METHOD THEREOF

BACKGROUND OF THE INVENTION

1. Field of the Invention

The present invention relates to a technique for monitoring a network device including an image forming apparatus using a network communication.

2. Description of the Related Art

Conventionally, for example, Japanese Patent Application Laid-open No. 10-304005 discusses a management system for remotely monitoring an image forming apparatus, e.g., a copying machine, via a network. Japanese Patent Application Laid-open No. 10-304005 further discusses that a remote diagnosis station includes a database for managing a plurality of communication protocols usable in a communication between the diagnosis station and a plurality of copying machines. A format to be used in reading data is determined based on a protocol identifier contained in communication information received from the copying machine. As described above, a communication protocol for communicating with a device is determined.

In Japanese Patent Application Laid-open No. 10-304005, the communication protocol for communicating with the copying machine registered as an object to be monitored can be specified to start monitoring. However, no determination is made as to whether or not the copying machine found in a search is to be set as a new object to be monitored.

In a case where a copying machine is found by the search, if the communication protocol thereof is specified to start monitoring by using a management system without exception, a duplicative management may be performed in a case where the found copying machine already belongs to another existing monitoring system.

Normally, in such a massive environment where more than several hundreds of image forming apparatuses such as the copying machines are connected to each other on the network, it is difficult to manually register an image forming apparatus to be monitored and set it as an object to be monitored. It is also troublesome work for an administrator to identify and select the image forming apparatus that is not yet monitored by the existing monitoring system among the image forming apparatuses found as a result of the search by the management system.

That is because device management information such as a device name of the found image forming apparatus can be acquired in the processing performed in a normal network search, however, special monitoring information indicating whether or not the found image forming apparatus has already been monitored is not acquired.

To acquire the monitoring information for each image forming apparatus among a vast number of image forming apparatuses thus found and to perform determination processing, e.g., filtering, imposes a remarkably heavy load onto the management system.

Therefore, to select the image forming apparatus to be monitored by the management system requires a cumbersome work for the administrator.

SUMMARY OF THE INVENTION

According to an aspect of the present invention, an image forming apparatus that communicates with a monitoring apparatus for transmitting monitoring information to a management apparatus via a network, the apparatus includes a storage unit configured to store information of a sending destination for transmitting the monitoring information to the management apparatus, a receiving unit configured to receive an inquiry from the monitoring apparatus as to whether or not the image forming apparatus includes a function for changing information of the sending destination, a responding unit configured to return a response to the inquiry indicating that the image forming apparatus includes the function for changing the information of the sending destination to the monitoring apparatus when the image forming apparatus includes the function for changing the information of the sending destination and a it is determined that no monitoring is performed by an external device different from the monitoring apparatus, whereas to return a response to the inquiry indicating that the image forming apparatus includes no function for changing the information of the sending destination to the monitoring apparatus when the image forming apparatus includes no function for changing the information of the sending destination or the monitoring is performed by the external device, a changing unit configured to receive a change for changing the sending destination of monitoring information to the monitoring apparatus from the monitoring apparatus having received the response indicating that the image forming apparatus includes the function for changing the information of the sending destination by the responding unit to change the information of the sending destination to the monitoring apparatus, and a transmission unit configured to transmit the monitoring information to the monitoring apparatus based on the changed information of the sending destination.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates partial information memorized in a non-volatile storage area of the device.

FIG. 5 illustrates an example of contents of a response from the device to a station monitoring apparatus.

FIG. 8 illustrates response patterns from the device to the station monitoring apparatus.

FIG. 9 illustrates an example of responses from the device to the station monitoring apparatus.

DESCRIPTION OF THE EMBODIMENTS

Various exemplary embodiments, features, and aspects of the invention will be described in detail below with reference to the drawings.

Figure 1:
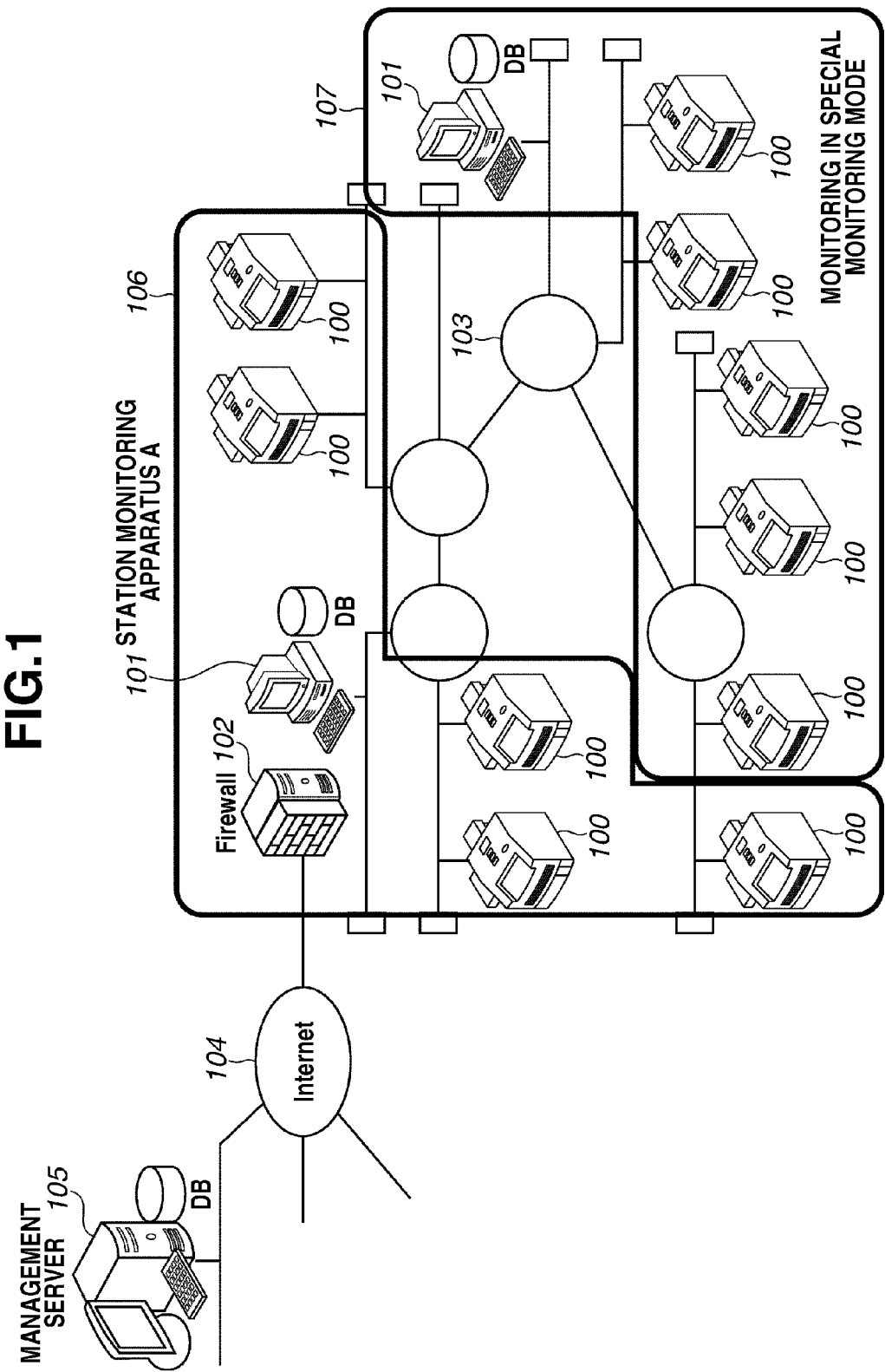
FIG. 1 illustrates a network system.

FIG. 1 illustrates a connection relationship between copying machines, a station monitoring apparatus, and a management server on a network according to an exemplary embodiment of the present invention.

In FIG. 1, a device 100 is, for example, a Multi Function Printer (MFP) or a Single Function Printer (SFP) connected to a company network of a client. The image forming apparatus having, for example, a printing function, a copying function, and a scanning function is hereinafter referred to as the device. A monitoring apparatus 101 is provided on a station (i.e., on the company network of the client) for the purpose of monitoring a plurality of devices 100.

The company network includes a firewall 102 as a connection point for establishing a connection with the internet. The firewall 102 prevents illegal network accesses from an external network to the company LAN 103.

The internet 104 is an external network on which a management server 105 is connected in order to collect monitoring information of the device 100 from the device directly or via the station monitoring apparatus 101.

The monitoring information includes operation information such as failure information and counter information of the device 100, firmware information, and device management information such as address information and a model name of the device 100. Any of the above described pieces of information are collected and managed by the monitoring apparatus or the like, as required, according to a content of a monitoring task.

FIG. 1 illustrates the station monitoring apparatus 101 as a typical personal computer (PC), however, the present invention is applicable to any device as far as a monitoring program that realizes a monitoring function described in the present invention runs on the device.

Therefore, the monitoring program can be installed in an exclusive hardware or any one of the plurality of devices 100 on the network in addition to the PC. Further, millions of networks of other clients are connected to an internet 104 and thus the management server 105 can collectively manage the devices of a plurality of clients in such a manner as described below.

The device 100 includes therein a program for realizing a self-monitoring function that runs on the device 100. With this function, the firmware information and the counter information for managing the device 100, and the failure information as to a service call error and jamming can be transmitted to the station monitoring apparatus 101 and the management server 105 as monitoring information.

The device 100 is initially set so as to directly transmit the monitoring information to the management server 105. The device 100 can transmit the monitoring information because of the setting of network environmental information, for example, of a proxy server at the time of installation of the device 100.

When the device 100 transmits the monitoring information to somewhere other than the management server 105, the monitoring information can be transmitted to a desired monitoring apparatus because a sending destination uniform resource locator (URL) becomes editable by inputting a license authentication code via an operation panel of the device 100. Further, the desired monitoring apparatus can set the sending destination URL of the monitoring information via the network with respect to the device 100.

The station monitoring apparatus 101 includes a function to transmit the sending destination URL to the device 100 and set it. The station monitoring apparatus 101 transmits an instruction for changing the sending destination URL of the monitoring information to the device 100 together with the authentication information. The device 100 having received the instruction for changing the sending destination URL changes the sending destination URL of the monitoring information to the sending destination URL based on the change instruction when the authentication information is verified and authorized.

The station monitoring apparatus 101 has a function to search for a device and thus can search for a device connected to the network such as a company LAN. An administrator for managing the device based on the monitoring result uses a list of devices found here when the device 100 is registered in the station monitoring apparatus 101 as the object to be monitored.

In FIG. 1, the plurality of devices 100 illustrated in a range of the frame 106 in the network is monitored by a single station monitoring apparatus 101. The station monitoring apparatus 101 included in the network of the frame 106 collects the monitoring information from the plurality of devices 100 located in the same frame to transmit thus collected monitoring information to the management server 105.

The station monitoring apparatus 101 provides a network service such as a Web site, and receives the monitoring information from the device 100 to be monitored. The station monitoring apparatus 101 instructs the device 100 to be monitored to set the sending destination URL to the device 100 to be monitored via the network at the start time of monitoring, thereby starting the monitoring of the device 100. The station monitoring apparatus 101 transmits the sending destination URL of the monitoring information to the device 100 via the network to set a monitoring method for providing the setting instruction to a normal monitoring mode.

In FIG. 1, the plurality of devices 100 within a range of the frame 107 in the network are monitored by the other single station monitoring apparatus 101. The station monitoring apparatus 101 in the network of the frame 107 collects the monitoring information from the plurality of devices 100 within the same frame 107 to manage the devices. As to the plurality of devices 100 within the frame 107, it is assumed that the devices are managed by a vender different from a vender that manages the devices within the frame 106.

The station monitoring apparatus 101 provides a network service, and receives the monitoring information from the device 100 to be monitored. A license authentication code is manually input via the operation panel of the device 100 when the monitoring is started and the sending destination URL is set, thereby starting the monitoring of the device 100. As described above, a monitoring method in which the license authentication code is input and the sending destination URL is set in the device 100 is set as the monitoring method of a special monitoring mode.

A management server 105 receives the monitoring information directly from the device 100 on an intranet 103 of a client via the internet 104, and thereby the device 100 can be managed.

In a case where a large number of devices exist on the company LAN of the client, the station monitoring apparatus 101 is used to collectively control listing of the devices existing on the company LAN, registration of the devices to be monitored, and starting of the monitoring of the devices. Accordingly, maintenance efficiency can be enhanced.

The management server 105 uses the collected monitoring information to allow the client to display a report of a charging counter, notify a failure event such as an error or an alarm, analyze a degree of wearing of parts of the device 100, manage the number of stocks of cartridges stored by the client, and the like. The above described analyzing function and management function are used in order to enable a person of a sales company, for example, in charge of the maintenance of the devices to provide suitable services to the clients.

Figure 2:
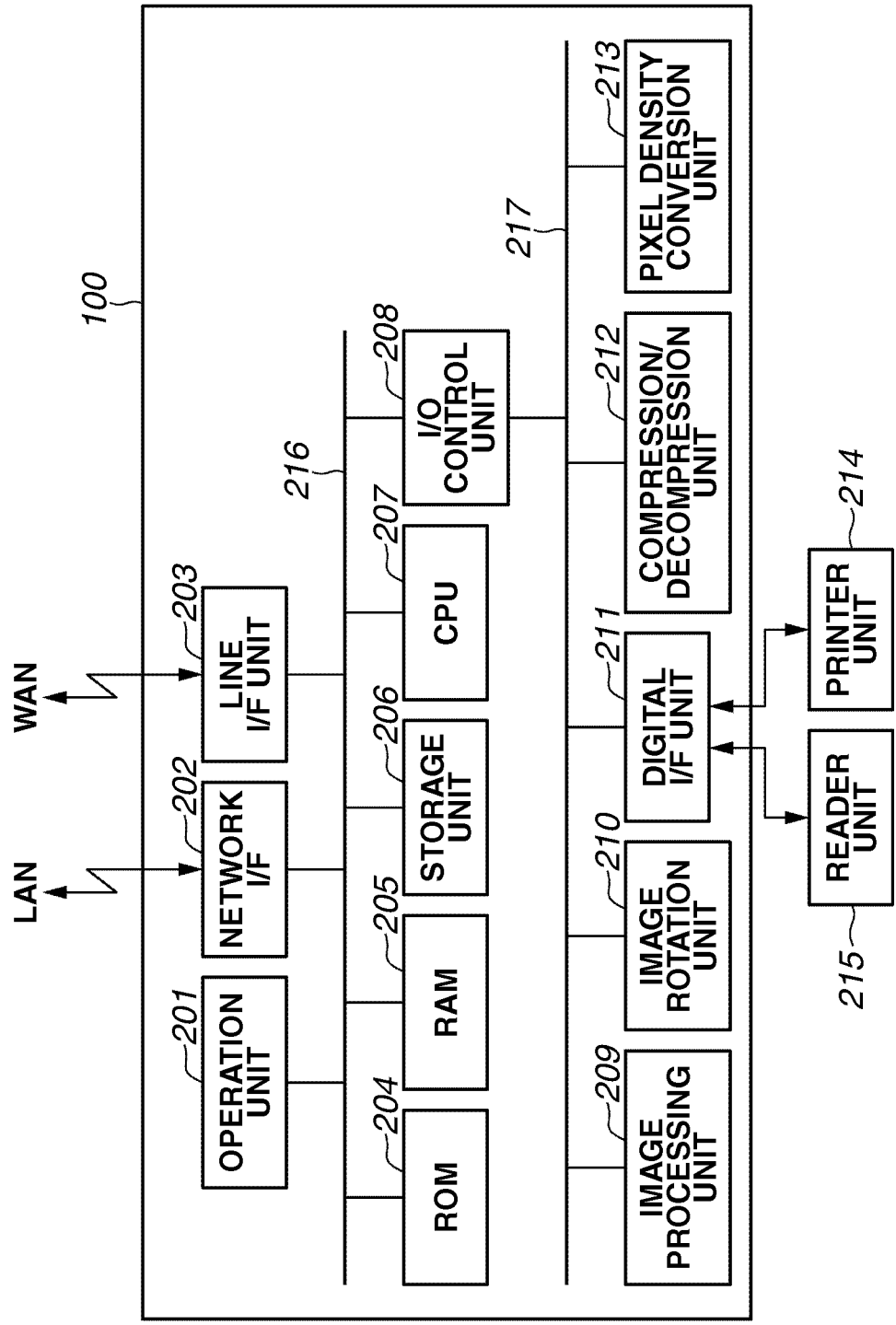
FIG. 2 illustrates an example of a hardware configuration of a device (image forming apparatus).

FIG. 2 is a block diagram illustrating a hardware configuration in the control unit of the device 100 in FIG. 1.

In the control unit of the device 100, controlling processing of a program for printing and scanning is performed. In addition thereto, an application, for example, of a device monitoring program is controlled.

When the device 100 transmits the monitoring information to the management server 105 or the station monitoring apparatus 101, the device 100 generates data of the monitoring information of the device 100 with a predetermined communication format in the control unit and performs processing such as a transmission of thus generated data to the station monitoring apparatus 101. The control unit includes a system management section, and an image processing and management section.

Components for performing the system management includes an operation unit 201, a network interface (I/F) unit 202, a line I/F unit 203, a Read Only Memory (ROM) 204, a Random Access Memory (RAM) 205, a storage unit 206, and a central processing unit (CPU) 207. Components for performing the image processing management includes an input/output (I/O) control unit 208, an image processing unit 209, an image rotation unit 210, a digital I/F unit 211, a compression/decompression unit 212, and a pixel density conversion unit 213.

The above described components are connected to a system bus 216 and an image bus 217. The operation unit 201 includes a display unit and a key inputting unit for the purpose of serving as an operation panel for a user. The display unit and the key inputting unit are controlled by the CPU 207. The user can issue various setting instructions as to reading by scanner and outputting by printing and a start/stop instruction via the key inputting unit.

The user can issue the start/stop instruction for monitoring the device via the operation unit 201. In a case where the device 100 directly transmits the monitoring information to the management server 105, the user sets network information such as an IP Address and a gateway via the operation unit 201 and performs a start operation for monitoring the device 100, thereby starting the monitoring of the device 100.

In a case where the device 100 is monitored in the special monitoring mode, the administrator of the device 100 inputs the license authentication code via the operation unit 201, thereby allowing the editing of the sending destination URL of the monitoring information of the device 100.

The administrator changes the sending destination URL to a URL of the station monitoring apparatus 101 and performs the start operation for monitoring the device 100, thereby starting the monitoring of the device 100. According to a device monitoring program to be executed in the CPU 207, the operation information such as the failure information and the counter information indicating the number of printings and the number of usages of the parts stored in the storage unit 206 is read out to be transmitted to the station monitoring apparatus 101 as the monitoring information of the device 100.

The Network I/F 202 is an interface unit for establishing a connection with the LAN through which a communication is established with the station monitoring apparatus 101 or the management server 105. The monitoring information is transmitted from the device 100 via the Network I/F 202.

In a case where the device 100 is monitored in the normal monitoring mode, the Network I/F 202 receives the instruction for setting the sending destination URL with the authentication information transmitted by the station monitoring apparatus 101.

The line I/F unit 203 is connected to an Integrated Service Digital Network (ISDN) or a public telephone network and controlled by a communication control program stored in the ROM 204. The line I/F unit 203 performs a transmission/reception of data with a remote terminal via an ISDN I/F, a modem, or a Network Control Unit (NCU). A facsimile transmission/reception is also performed by using the line I/F unit 203.

The ROM 204 stores a control program for controlling the device 100 and a device monitoring program. The programs are executed by the CPU 207. The RAM 205 is a work area for executing the programs, and also is a memory for temporarily storing image data and status information of the device 100 necessary for enabling the device monitoring program to monitor the device 100.

A nonvolatile storage unit 206 stores various operation mode settings that are necessary to be kept after rebooting of the device 100, a counter value (e.g., the number of printed sheets for each size and the number of readings of documents), and status information (including a status flag).

The I/O control unit 208 is a bus bridge for establishing a connection between a system bus 216 and an image bus 217 for performing a high speed transfer of image data. The image bus 217 includes a protocol control information (PCI) bus or an Institute of Electrical and Electronics Engineers (IEEE) 1394. The device 100 described below is placed on the image bus 217.

A digital I/F unit 211 establishes a connection between a reader unit 215 and a printer unit 214 with the control unit of the device 100, and performs a synchronous/non-synchronous conversion of the image data. Information detected by the above described various sensors placed at positions in the reader unit 215 and the printer unit 214, flows to the system bus 216 via the digital I/F unit 211 and the I/O control unit 208.

An image processing unit 209 performs a correction/processing/editing of the input image data and the output image data. An image rotation unit 210 rotates the image data. An image compression/decompression unit 212 performs compression/decompression processing, for example, of a JPEG with respect to a multivalued image data and a JBIG/MMR/MR/MH with respect to binary image data, respectively. An image density conversion unit 213 converts a resolution of the image data to be output.

Figure 3:
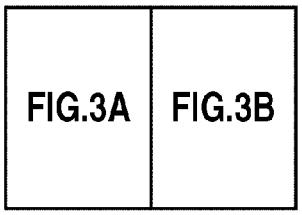
FIG. 3 (3A and 3B) is a block diagram illustrating an example of a configuration of a software function of the device.
Figure 3A:
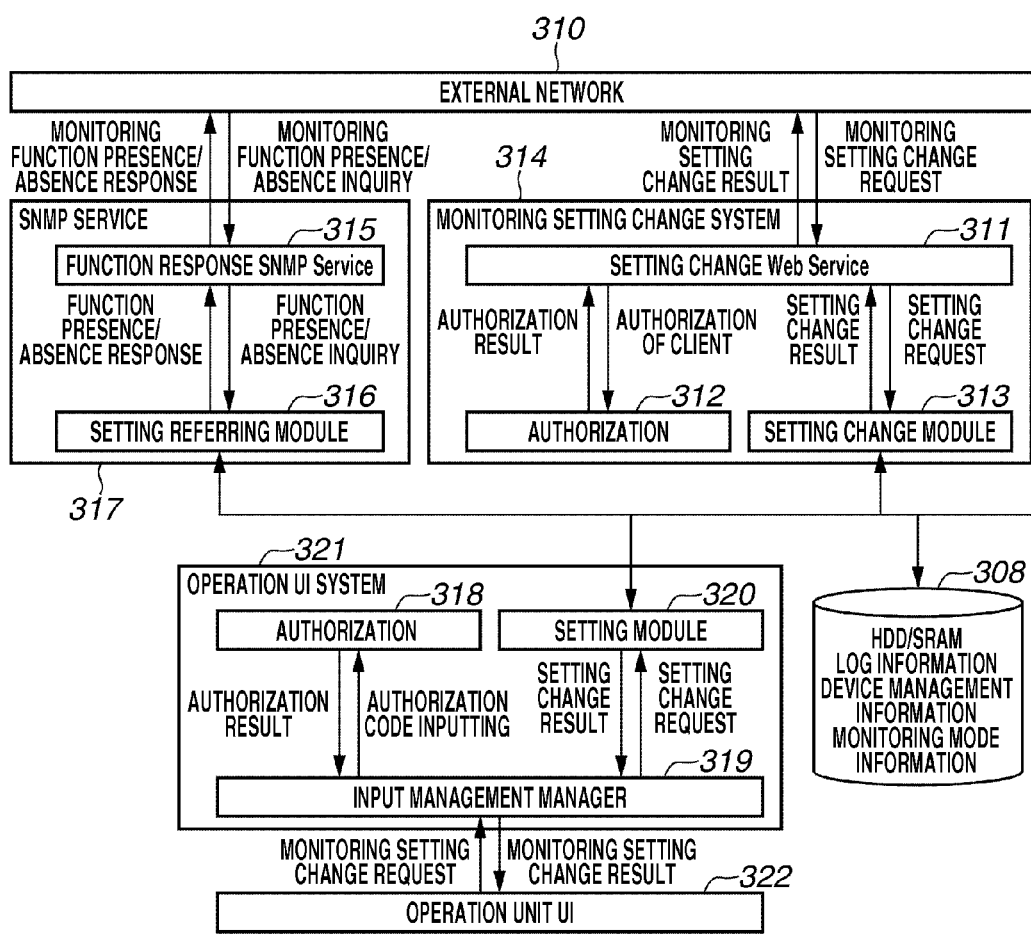

FIG. 3 (3A and 3B) illustrates a configuration of each of software modules that operates in the device 100 of FIG. 1. The software modules are subjects of virtual operations of a function to be realized when the CPU 207 executes the program.

In FIG. 3, software modules 301 through 309 and 311 through 321 correspond to the software modules of the device 100. The software modules includes a software module 307 of a built-in diagnostics system, a software module 314 of the monitoring setting change system, a software module 317 of the SNMP service, and a software module 321 of the operation panel system.

The device interface 301 corresponds to the I/O control unit 208 in FIG. 2. A status including an error (sometimes referred to as a failure) detected by the printer unit 214 via the interface is notified to the built-in diagnostics system 307.

Examples of the error include a service call error such as a hard disk error and a charging counter error, paper jamming, a warning such as a "toner low", a door opening, and an excessive load of a discharge tray.

A state event module 302 notifies error information notified from a device interface 301 to a manager 304. The error information notified from the device interface 301 is made based on a status of an image forming apparatus detected by various sensors in the printer unit 214 in FIG. 2. The error information changes with time.

A timer 303 issues a request for transmitting a counter to be performed at a predetermined time and a request for re-transmitting the error information that could not be transmitted to the manager 304.

The nonvolatile storage unit 308 stores log information to be transmitted together with device management information such as firmware information and the identification number necessary for monitoring the device 100, the counter information, and the failure information. The nonvolatile storage unit 308 further stores the monitoring mode information indicating in which mode the device 100 is presently monitored. The manager 304 confirms the monitoring information to be transmitted via a logic module 305.

The manager 304 notifies the failure information such as the service call error and the device management information such as the firmware information and the parts information relating to the device 100 of its own to a Simple Object Access Protocol (SOAP) function module 306 as the monitoring information. Examples of the device management information include an Internet Protocol (IP) address, a Media Access Control (MAC) address, and a serial number, a product name, and a product type of the device 100.

The SOAP function module 306 passes a content received from the manager 304 (i.e., the failure information and the device management information) to a Hyper Text Transfer Protocol (HTTP)/SOAP client module 309. The SOAP function module 306 issues a request for generating a markup language description and a request for transmitting the information of the generated markup language description to the sending destination URL. The information of the sending destination URL is acquired via the logic module 305 as the device management information.

The HTTP/SOAP client module 309 receives the device management information from the SOAP function module 306 to generate a schema corresponding to each of the failure information and the device management information. Data necessary for generating the schema is acquired from the nonvolatile storage area by the HTTP/SOAP client module 309 via the logic module 305.

The HTTP/SOAP client module 309 transmits the data of the generated markup language description to the device as a sending destination. An example of the markup language description includes an eXtensible Markup Language (XML).

A Setting Change Web Service 311 receives an instruction for changing the sending destination URL received from the Network I/F 202 of FIG. 2. The instruction for changing the sending destination URL received by the Setting Change Web Service 311 is authorized by an authorizing module 312.

The authorization may be realized by a client authorization of Hypertext Transfer Protocol over Secure Socket Layer (HTTPS) or may be performed by using data such as a user account and a password. Only a legitimate station monitoring apparatus 101 that can issue the instruction for changing the sending destination URL to the device 100 can issue this instruction. For example, the other monitoring apparatus that is used in the special monitoring mode cannot issue such instruction.

The authorizing module 312 returns the result of the authorization to the Setting Change Web Service 311, and, in a case where the authorization is successful, a request for changing the sending destination URL is issued to the setting change module 313 based on the instruction for changing the received setting destination URL. The setting change module 313 records information indicating the new sending destination URL and a start of monitoring in the normal monitoring mode in the nonvolatile storage unit 308.

An instruction is issued so as to re-read the settings in order to reflect the settings to the manager 304. The manager 304 after receiving the instruction for re-reading the settings temporally stops device monitoring processing, and reads out the sending destination URL stored in the nonvolatile storage unit 308, thereby reflecting the change of the settings of the monitoring program.

As described above, switching can be performed between a direct transmission of the monitoring information transmitted by the device 100 to the management server 105 or a transmission of the monitoring information transmitted by the device 100 to the station monitoring apparatus 101. In a case where the setting is to be returned to the original setting, the URL is changed to the sending destination URL of the management server 105 by using the instruction for changing the sending destination URL from the station monitoring apparatus 101, and thereby the URL can be returned to the original setting.

An operation unit user interface (UI) 322 corresponds to the operation unit 201 in FIG. 2. An operator can control, via the operation unit UI 322, to perform the start/stop of the monitoring of the device 100 and to perform the setting for monitoring in special monitoring mode. When the operator instructs the start of the monitoring of the device 100 via the operation unit 322, an input management manager 319 issues a processing request to the setting module 320.

When the setting module 320 receives the request for processing the monitoring of the device 100, the setting module 320 writes in the nonvolatile storage unit 308 information indicating that the device 100 has come to be subjected to the direct monitoring mode. Accordingly, even when the device 100 is restarted, the built-in diagnostics system confirms the monitoring mode of the present device 100 during start-up of the device 100. Therefore, an appropriate monitoring of the device 100 can be continued.

The request for starting the monitoring of the device 100 issued by the setting module 320 is notified to the manager 304 and, immediately thereafter, the processing for starting the monitoring of the device 100 is started.

In a case where the operator issues an instruction for changing the mode to the special monitoring mode via the operation unit 322, the operator inputs the license authentication code. When the input management manager 319 receives the license authentication code, the input management manager 319 transmits the code to the authorizing module 318.

The input management manager 319 acquires the result of the authorization of the license authentication code from the authorizing module 318. In a case where the input management manager 319 determines that the result of the authorization is correct, the input management manager 319 displays the sending destination URL on the operation unit UI as the editable URL. When the operator edits the sending destination URL to another URL, and issues an instruction to start monitoring the device 100, the input management manager 319 transmits a new sending destination URL and a request for starting the monitoring of the device 100 to a setting module 320.

When the setting module 320 receives the new sending destination URL and the request for starting the monitoring of the device 100, the setting module 320 records in the nonvolatile storage unit 308 information indicating the new sending destination URL and a start of the monitoring of the device 100 in the special monitoring mode. Subsequently, the setting module 320 requests the manger to start monitoring the device 100. Accordingly, a transmission of the monitoring information is performed with respect to the predetermined monitoring apparatus indicated by the new sending destination URL.

A Simple Network Management Protocol (SNMP) service 317 operates on the device 100. Some devices on the network cannot deal with the request for switching the mode to the normal monitoring mode issued by the station monitoring apparatus 101. The SNMP service 317 sets various types of information as to the device 100, and sends a response indicating whether or not the device 100 can be monitored in the normal monitoring mode.

The station monitoring apparatus 101 makes an inquiry to the Object Identification Data (OID) indicating whether or not the device 100 can be monitored in the normal monitoring mode. The function response SNMP Service 315 interprets the inquiry to the designated OID and makes an inquiry about the presence or absence of the function to a setting referring module 316. The setting referring module 316 makes an inquiry to the nonvolatile storage unit 308 as to whether or not the device 100 has a function of the normal monitoring mode.

The device 100 supports the monitoring in the normal monitoring mode and, in a case where the instruction for changing the sending destination URL can be received, the device 100 confirms the presence of a function of the normal monitoring mode from the nonvolatile storage unit 308. When the confirmation result is sent to the function response SNMP Service 315, the function response SNMP Service 315 responds to the OID inquiry of the station monitoring apparatus 101.

When the station monitoring apparatus 101 detects that the device 100 has a function of the normal monitoring mode, the station monitoring apparatus 101 makes an inquiry about URL information of the Setting Change Web Service. Similar to the inquiry about the function of the normal monitoring mode, the station monitoring apparatus 101 makes an inquiry to the OID indicating the URL of the Setting Change Web Service.

In response to the inquiry, the device 100 acquires the URL information of the Setting Change Web Service from the nonvolatile storage unit 308 and returns the URL of the Setting Change Web Service via the setting referring module 316.

FIG. 4 illustrates a portion of information recorded in the nonvolatile storage unit 308 illustrated in FIG. 3. The device 100 confirms and continuously monitors the information in the nonvolatile storage unit 308 at a time of booting or starting monitoring the device 100.

The device identification number is a number for identifying the device 100. For example, the serial number is used for the device identification number. The device identification number enables the station monitoring apparatus 101 and the management server 105 to identify the device 100.

As a version of the monitoring program, version information of the monitoring program used when the device 100 performs the self-monitoring, is recorded. A transmission format of the monitoring information differs according to the version of the monitoring program or more detailed data can be acquired as the version of the monitoring program is upgraded.

The self-monitoring function is information indicative of a start/stop state of the monitoring of the device 100. The device 100 that is already ON can confirm the information in order to confirm whether the device 100 is monitored or not monitored. In a case where the self-monitoring function is "enable" upon starting the device 100, monitoring information is transmitted to the sending destination URL at a timing according to a content of the information to be transmitted.

Examples of the monitoring mode include a "direct monitoring mode" for directly transmitting the monitoring information to the management server 105, a "normal monitoring mode" for transmitting the monitoring information to the station monitoring apparatus 101, and a "special monitoring mode" for transmitting the monitoring information to the monitoring apparatus other than the above.

In the sending destination URL, information of the sending destination URL to which the monitoring information is to be transmitted when the device 100 is monitored, is recorded.

In a case where the device 100 is in the normal monitoring mode, the information of the sending destination URL indicative of the station monitoring apparatus 101 that is to be transmitted together with the authentication information from the station monitoring apparatus 101, is stored. In a case where the device 100 is in the special monitoring mode, the information of the sending destination URL to be input together with the license authentication code through the operation panel, is stored.

In a case of the device 100 that can be placed in the normal monitoring mode, "YES" is recorded as to the function for changing the sending destination URL. The station monitoring apparatus 101 requests the information when it communicates with the device 100, the station monitoring apparatus 101 can grasp a fact that the target device 100 has the normal monitoring mode. If no response is acquired from the device 100, the station monitoring apparatus 101 determines that the device 100 can perform no monitoring in the normal monitoring mode.

The Setting Change Web Service URL is used to receive the instruction for changing the sending destination URL transmitted by the station monitoring apparatus 101 in a case where the device 100 can be placed in the normal monitoring mode. The device 100 receives the instruction for changing the sending destination URL via the URL of the Web Service, and starts monitoring in the normal monitoring mode.

FIG. 5 illustrates a portion of response information of the function response SNMP Service 315 illustrated in FIG. 3.

The station monitoring apparatus 101 makes an inquiry to the SNMP Service of the device 100 to thereby confirm if the device 100 has the normal monitoring mode. The object ID (OID) indicative of a name of the Web Service indicates a name of the function the device 100 has.

In a case where the device 100 supports the normal monitoring mode, the device 100 has the Setting Change Web Service as the Web Service for instructing a change of the sending destination URL. Therefore, when the station monitoring apparatus 101 makes an inquiry as to whether or not the device 100 supports the normal monitoring mode, the station monitoring apparatus 101 makes an inquiry about the OID indicative of the name of the Web Service.

At the time, the station monitoring apparatus 101 receives a response including the OID indicative of the name of the Setting Change Web Service from the target device that supports the normal monitoring mode. Upon receiving the response, the station monitoring apparatus 101 makes an inquiry of the URL information to be used in transmitting the instruction for changing the sending destination URL. The target device returns a response including the OID of a URL of the Web Service indicative of the URL of the Setting Change Web Service.

A Web Service State is the OID indicating a state whether or not the Setting Change Web Service is in service. When the station monitoring apparatus 101 makes the inquiry about the OID to the device 100, the station monitoring apparatus 101 determines that the Setting Change Web Service is valid if it receives a response indicative of ON and that the Setting Change Web Service is invalid if it receives a response indicative of OFF, respectively.

The device 100 invalidates the network services not in use so as to prevent them from being undesirable security holes. Generally, the network services are validated according to the environment of the user who uses the device 100. Consequently, in a case where the response is OFF when the station monitoring apparatus 101 makes the inquiry, the Setting Change Web Service is not yet in-service.

The OID of the Web Service State allows writing of the SNMP and thus can start the Setting Change Web Service of the device 100 from the outside by issuing an instruction for allowing the writing (i.e., by issuing the writing instruction of ON). Further, when the setting change becomes no longer necessary, the OID of the Web Service State makes an instruction of OFF in the writing of the SNMP, and invalidates the Setting Change Web Service.

An example of an operation of the device 100 in the monitoring system is described below in detail.

Figure 6:
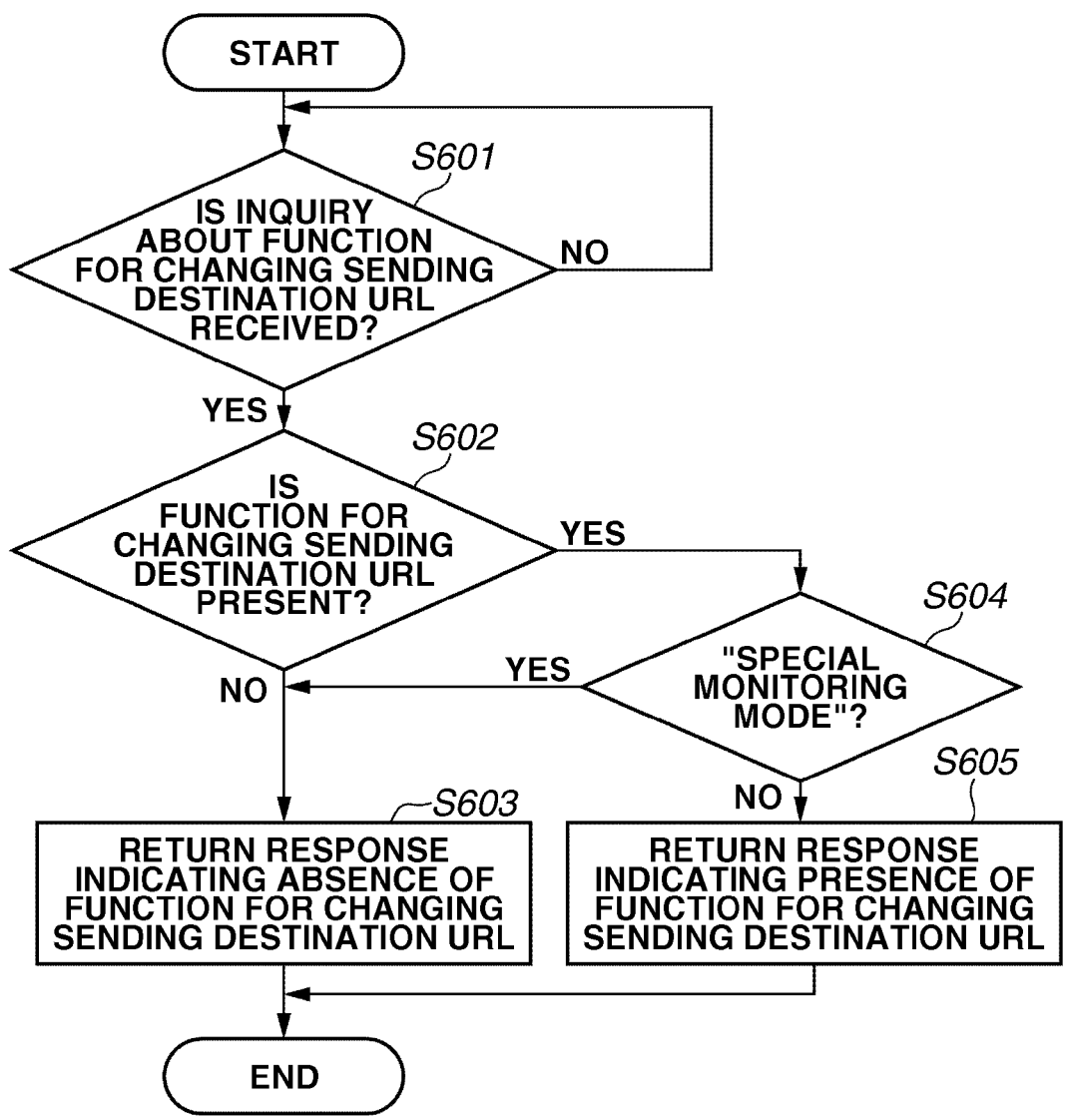
FIG. 6 is a flow chart illustrating an example of an operation of the device according to a first exemplary embodiment.

FIG. 6 is a flow chart illustrating processing after the device 100 receives an inquiry from the station monitoring apparatus 101 before the device 100 returns a response to the station monitoring apparatus 101. The processing of the flow chart is stored in any one of the storage units of the ROM 204 and the storage unit 206 of FIG. 2, expanded on the RAM 205 as required, and executed by the CPU 207. The processing illustrates the processing performed by the SNMP service 317 illustrated in FIG. 3.

When the device 100 is started and the processing of the SNMP service 317 is started, in step S601, a determination is made if the inquiry as to whether or not the device 100 has the function for changing the sending destination URL from the station monitoring apparatus 101 is received. When the device 100 receives the inquiry from the station monitoring apparatus 101 (YES in step S601), the processing proceeds to step S602.

In step S602, the device 100 determines whether the device 100 has the function for changing the sending destination URL. In a case where the device 100 has the change function (YES in step S602), the processing proceeds to step S604. On the other hand, in a case where the device 100 has no change function (NO in step S602), the processing proceeds to step S603. In step S604, the SNMP service 317 acquires information from the nonvolatile storage unit 308 to determine whether or not the present monitoring mode set to the device 100 is the "special monitoring mode".

When the device 100 is presently in the "special monitoring mode", the device 100 is being monitored by the other monitoring apparatus. In managing the device, in order to avoid a duplicative management, the reception of the request for changing the sending destination URL from the station monitoring apparatus 101 needs to be limited.

In step S604, in a case where the device 100 is determined being in the "special monitoring mode" (YES in step S604), the processing proceeds to step S603. On the other hand, in a case where the device 100 is determined not being in the "special monitoring mode" (NO in step S604), the processing proceeds to step S605.

In step S603, the function response SNMP Service 315 returns a response indicating that the device 100 has no function for changing the sending destination URL to the station monitoring apparatus 101 as the response to the inquiry. In step S605, the function response SNMP Service 315 returns a response indicting that the device 100 has the function for changing the sending destination URL to the station monitoring apparatus 101 as the response to the inquiry.

The station monitoring apparatus 101 transmits the request for changing the sending destination URL to the device 100 in response to the response received from the device 100 according to the processing in step S605, and changes the sending destination URL of the monitoring information set to the device 100. Accordingly, the monitoring mode of the device 100 is changed from the "direct monitoring mode" for directly transmitting the monitoring information to the management server 105 to the "normal monitoring mode" for transmitting the monitoring information to the station monitoring apparatus 101.

In a case where the station monitoring apparatus 101 receives the response from the device 100 as a result of the processing in step S603, the station monitoring apparatus 101 does not transmit the request for changing the sending destination URL to the device 100. In other words, in this case, the monitoring in the "direct monitoring mode" or the "special monitoring mode" is continued for the device 100.

In the processing according to the present exemplary embodiment, even in a case of the device having the function for changing the sending destination URL, when the device 100 is in the "special monitoring mode", the device 100 is configured to transmit the response indicating that the device 100 does not have the function for changing the sending destination URL to the station monitoring apparatus 101. The station monitoring apparatus 101 does not change the setting of the device 100 that does not have the function for changing the sending destination URL.

Accordingly, it becomes unnecessary for the station monitoring apparatus 101 to make further inquiry about the monitoring mode of the device 100, so that the device 100 as the suitable object to be monitored can be specified with less load among the vast number of devices on the network so as not to involve duplicative management.

A second exemplary embodiment shows a system that can specify the device 100 to be monitored more effectively, in such a manner that the device changes the response according to the monitored state of its own with respect to the inquiry about the available communication function from the station monitoring apparatus 101.

Figure 7:
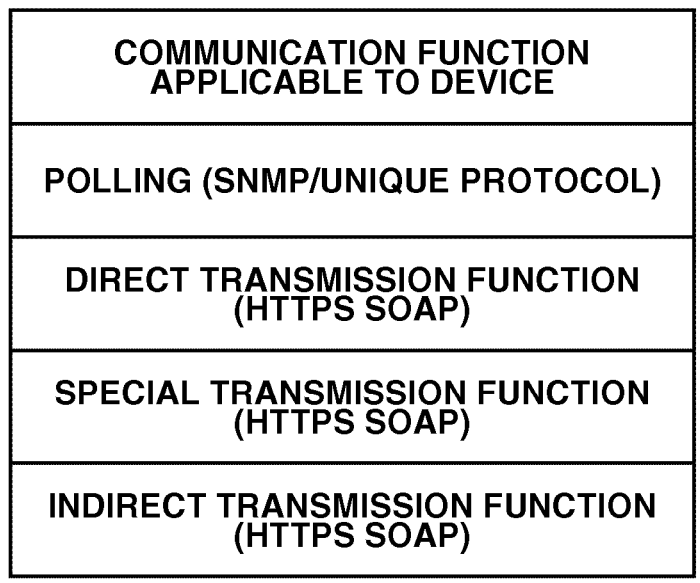
FIG. 7 illustrates a communication function of the device.

FIG. 7 illustrates types of communication functions available when the station monitoring apparatus 101 monitors the device 100. The device 100 has a plurality of communication functions from which one is selected to monitor the device 100. The device 100 manages a table indicating which communication function is available.

A polling (i.e., the SNMP/unique protocol) means that the station monitoring apparatus 101 collects the monitoring information from the device 100 by using a polling protocol, thereby performing the monitoring. This means that the station monitoring apparatus 101 makes an inquiry about a state of the device 100 without using the self-monitoring function of the device 100, thereby allowing the station monitoring apparatus 101 to monitor the device 100.

While the monitoring is performed by using the communication, the device 100 stores that the monitoring is performed by the polling that uses the protocol unique to the SNMP or the monitoring apparatus. Basically, the monitoring by collecting the monitoring information from the station monitoring apparatus 101 by the polling can be performed in all the devices (i.e., the image forming apparatus).

A direct transmission function (HTTPS SOAP) means that the monitoring is performed in such a manner that the monitoring information is directly transmitted from the device 100 to the management server 105 by using the SOAP.

A special transmission function (HTTPS SOAP) means that the monitoring is performed in such a manner that the monitoring information is transmitted from the device 100 to the monitoring apparatus different from the station monitoring apparatus 101 by using the SOAP.

An indirect transmission function (HTTPS SOAP) means that the monitoring is performed in such a manner that the monitoring information is transmitted from the device 100 to the station monitoring apparatus 101 and is further transmitted from the station monitoring apparatus 101 to the management server 105. This is a monitoring method that is realized in such a manner that the station monitoring apparatus 101 changes the sending destination URL of the device 100 via the network, and thus corresponds to the normal monitoring mode of the first exemplary embodiment.

FIG. 8 illustrates contents of the responses of the device 100 when the station monitoring apparatus 101 makes an inquiry about a "type of the available communication function" to the device 100 when the station monitoring apparatus 101 starts monitoring the device 100. The device 100 responds the available type of communication function according to the monitored state of the device 100 at the time.

In FIG. 8, (1) In a case where the device 100 is not presently monitored, such a response is returned that the device 100 can be monitored by using at least any one of the available functions among the polling, the direct transmission function, and the indirect transmission function; and (2) In a case where the device 100 is monitored by using the polling, such a response is returned that the device 100 can be monitored by using the direct transmission function and the indirect transmission function in response to the inquiry from the station monitoring apparatus 101.

The station monitoring apparatus 101 can determine that the device 100 is monitored by some way in a case where the content of the response does not include the polling. Since the direct transmission and the indirect transmission uses the self-monitoring function in the device 100, resources can be saved more than when monitoring by the polling from the station monitoring apparatus 101 since the station monitoring apparatus 101 does not need to keep the settings or the like for each device. Therefore, the device 100 returns the direct transmission function and the indirect transmission function as a response for the purpose of deciding the suitable monitoring method.

In FIG. 8, (3) In a case where the monitoring is performed by using the direct transmission function, such a response is returned that the device 100 can be monitored by using the indirect transmission function in response to the inquiry from the station monitoring apparatus 101; (4) In a case where the monitoring is performed by using the special transmission function, such a response is returned that there is no available communication function; (5) In a case where the monitoring is performed by using the indirect transmission function, such a response is returned that the device 100 can be monitored by using the indirect transmission function.

With a consideration of a case where the network information of the station monitoring apparatus 101 is changed, the device 100 is configured so that it returns a response that the indirect transmission function is available, thereby enabling the station monitoring apparatus 101 to issue a suitable request for changing the sending destination URL.

<Example of SNMP Response of Device>

FIG. 9 illustrates an example of responses to the station monitoring apparatus 101 via the SNMP Service 317.

The station monitoring apparatus 101 makes an inquiry to the device 100 about a monitored state thereof, a communication function used in the monitoring, and an Object ID (OID) of the SNMP indicating the available communication function. It is assumed that the device 100 at the time is monitored, for example, by using the polling.

The device 100 returns, as the response for the monitored state, a value indicative of "in monitoring" and further returns the "polling" as the communication function used in the monitoring. As illustrated in FIG. 8, as a response of a case where monitoring is performed by using the polling, the device 100 returns a response indicating that the "direct transmission function" and the "indirect transmission function" are available.

Figure 10:
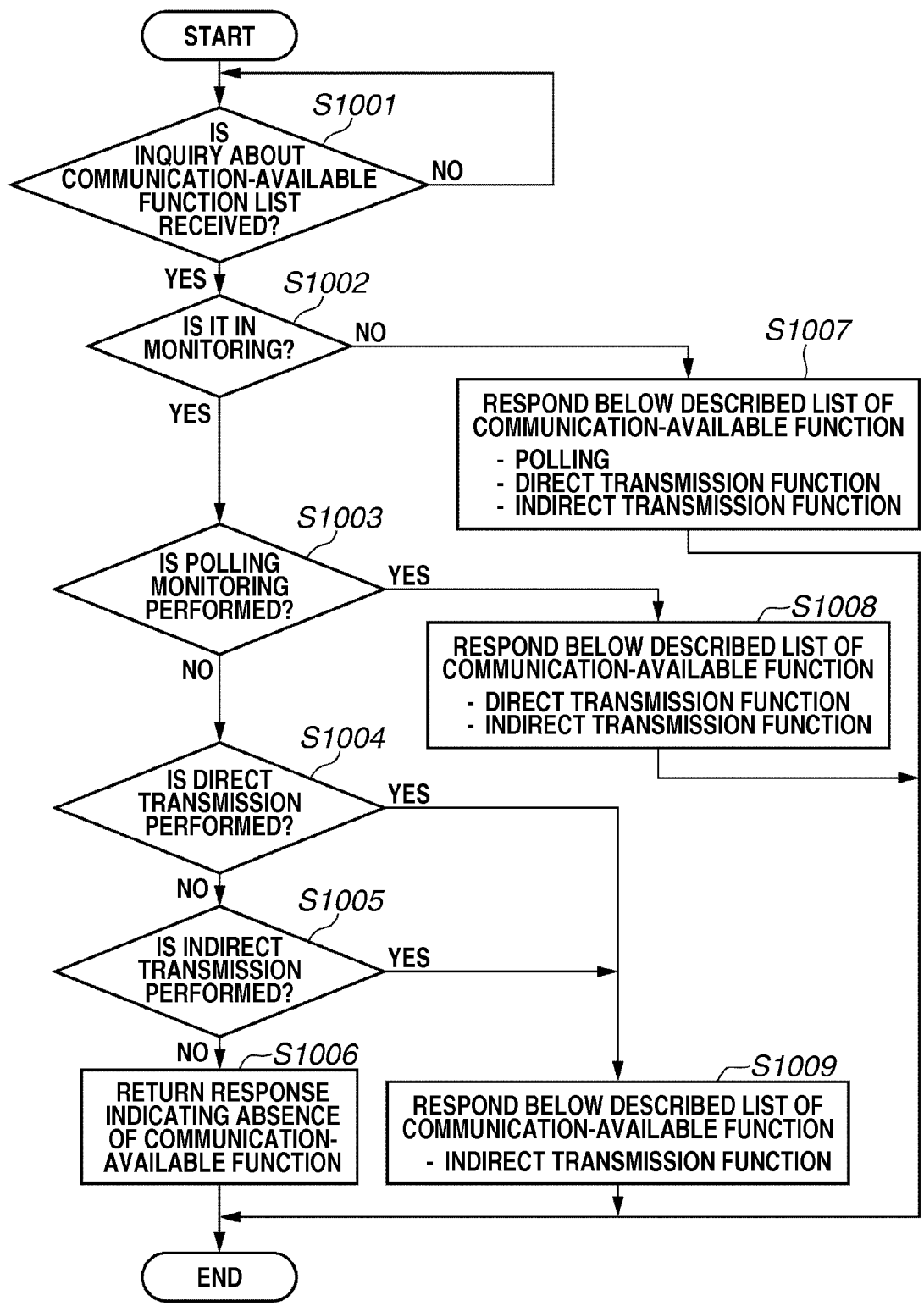
FIG. 10 is a flow chart illustrating an example of the operation of the device in the second exemplary embodiment.

FIG. 10 is a flow chart illustrating an operation of the device 100 when it receives an inquiry about an available communication function from the station monitoring apparatus 101. Processing illustrated by the flow chart is realized by causing a program stored in either one of the ROM 204 or the storage unit 206 illustrated in FIG. 2 to expand on the RAM 205, as required, and executing the program by the CPU 207. The processing of the flow chart is mainly performed by the SNMP service 317 illustrated in FIG. 3.

In step S1001, the device 100 is on standby until it receives from the station monitoring apparatus 101 the inquiry about a list of the communication functions available in monitoring the device 100 itself. In a case where the device 100 receives the inquiry from the station monitoring apparatus 101 (YES in step S1001), the processing proceeds to step S1002. In step S1002, the device 100 identifies whether or not the monitoring is performed by either the monitoring apparatus or the management apparatus.

In a case where the monitoring is performed (YES in step S1002), the processing proceeds to step S1003. On the other hand, in a case where the monitoring is not performed (NO in step S1002), the processing proceeds to step S1007. In step S1007, the device 100 returns a response of a function list including all the communication functions supported by the device 100 among the "polling", the "direct transmission function", and the "indirect transmission function" to the station monitoring apparatus 101, and then the processing is ended. It is assumed here that the device 100 supports the "direct transmission function" and the "indirect transmission function".

In step S1003, the device 100 determines whether or not the monitoring is performed by using the polling. In a case where the monitoring is not performed by using the polling (NO in step S1003), the processing proceeds to step S1004. On the other hand, in a case where the device 100 determines that the monitoring is performed by using the polling (YES in step S1003), the processing proceeds to step S1008.

In step S1008, the device 100 returns the response of the function list including the "direct transmission function" and the "indirect transmission function" supported by the device 100 to the station monitoring apparatus 101, and then the processing is ended.

In step S1004, the device 100 determines whether or not the monitoring is performed by using the direct transmission function. In a case where the device 100 determines that the monitoring is performed by using the direct transmission function (YES in step S1004), the processing proceeds to step S1009. On the other hand, in a case where the device 100 determines that the monitoring is performed without using the direct transmission function (NO in step S1004), the processing proceeds to step S1005. In step S1005, the device 100 determines whether or not the monitoring is performed by using the indirect transmission function.

In a case where the device 100 determines that the monitoring is performed by using the indirect transmission function (YES in step S1005), the processing proceeds to step S1009. On the other hand, in a case where the device 100 determines that the monitoring is performed without using the indirect transmission function (NO in step S1005), the processing proceeds to step S1006.

In step S1009, the device 100 returns a response indicating that the "indirect transmission function" is available to the station monitoring apparatus 101, and the processing is ended. In step S1006, since the device 100 can determine that the monitoring is performed by using the special communication function, the device 100 returns a response indicative of absence of the available communication function to the station monitoring apparatus 101.

According to the second exemplary embodiment, an erroneous selection, by the user, of the device to be monitored by the station monitoring apparatus 101 can be prevented in a large-scale environment, and more effective monitoring method can be used.

In a case where the indirect transmission function is determined to be suitable as the communication function to be used in monitoring according to the present exemplary embodiment, such a processing is performed that the information of the sending destination (URL) according to the first exemplary embodiment is changed to the URL of the station monitoring apparatus 101.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-207892 filed Sep. 16, 2010, which is hereby incorporated by reference herein in its entirety.

What is claimed is:

1. An image forming apparatus configured to communicate with a monitoring apparatus for transmitting monitoring information to a management apparatus via a network, the image forming apparatus comprising:
    a storage unit configured to store information of a sending destination for transmitting the monitoring information to the management apparatus;
    a receiving unit configured to receive an inquiry from the monitoring apparatus as to whether or not the image forming apparatus includes a function for changing information of the sending destination;
    a responding unit configured to return, to the monitoring apparatus, a response indicating that the image forming apparatus includes the function for changing the information of the sending destination in accordance with the inquiry when the image forming apparatus includes the function for changing information of the sending destination and it is determined that no monitoring is performed by an external device different from the monitoring apparatus, and to return, to the monitoring apparatus, a response indicating that the image forming apparatus includes no function for changing the information of the sending destination in accordance with the inquiry when the image forming apparatus includes no function for changing the information of the sending destination or the monitoring is performed by the external device;
    a changing unit configured to change the information of the sending destination to the monitoring apparatus in accordance with a reception of change information for changing the sending destination of monitoring information to the monitoring apparatus, having received the response indicating that the image forming apparatus includes the function for changing the information of the sending destination; and
    a transmission unit configured to transmit the monitoring information to the monitoring apparatus based on the change information of the sending destination.

2. The image forming apparatus according to claim 1, wherein the responding unit is configured to return a response indicating that the image forming apparatus includes no function for changing the information of the sending destination to the monitoring apparatus when the monitoring is performed by the external device even if the image forming apparatus has the function for changing the information of the sending destination.

3. The image forming apparatus according to claim 1, further comprising:
    a function responding unit configured to return a function response about an available communication function when an inquiry about the available communication function is received from the monitoring apparatus;
    wherein the function responding unit is configured to return a function response indicating that the monitoring information can be transmitted to the monitoring apparatus as the available communication function in a case where the monitoring is directly performed by the management apparatus, and to return a function response indicating that the image forming apparatus includes no available communication function in a case where the monitoring is performed by the external device; and
    wherein the monitoring apparatus makes an inquiry to the image forming apparatus as to whether or not the image forming apparatus includes the function for changing the information of the sending destination based on the response indicating that the monitoring information can be transmitted to the monitoring apparatus as the available communication function.

4. The image forming apparatus according to claim 1, wherein the monitoring information includes at least either one of failure information and counter information of the image forming apparatus.

5. A control method for an image forming apparatus configured to communicate with a monitoring apparatus for transmitting monitoring information to a management apparatus via a network, the method comprising:
    storing in a storage unit information of a sending destination for transmitting monitoring information to the management apparatus;
    receiving an inquiry from the monitoring apparatus as to whether or not the image forming apparatus includes a function for changing the information of the sending destination;
    sending a response indicating that the image forming apparatus includes a function for changing the information of the sending destination in accordance with the inquiry when it is determined that the image forming apparatus includes the function for changing the information of the sending destination and no monitoring is performed by an external device different from the monitoring apparatus;
    sending a response indicating that the image forming apparatus includes no function for changing the information of the sending destination in accordance with the inquiry when the image forming apparatus includes no function for changing the information of the sending destination or the monitoring is performed by the external device;

changing the information of the sending destination to the monitoring apparatus in accordance with a reception of change information for changing the sending destination of the monitoring information to the monitoring apparatus, having received the response indicating that the image forming apparatus includes the function for changing the information of the sending destination; and transmitting the monitoring information to the monitoring apparatus based on the changed information of the sending destination.

6. The control method according to claim 5, further comprising:

returning a response as to an available communication function upon receiving an inquiry from the monitoring apparatus as to whether or not the image forming apparatus includes the function for changing the information of the sending destination based on the response indicating that the monitoring information can be transmitted to the monitoring apparatus as the available communication function;

wherein a response is returned indicating that the monitoring information can be transmitted to the monitoring apparatus as the available communication function in a case where the management apparatus performs a direct monitoring, and a response is returned indicating that the image forming apparatus includes no available communication function in a case where the external device performs the monitoring.

7. The control method according to claim 5, wherein the monitoring information includes at least either one of failure information and counter information of the image forming apparatus.

8. A non-transitory computer readable storage medium on which is stored a computer program for causing a computer to execute a method for controlling an image forming apparatus configured to communicate with a monitoring apparatus for transmitting monitoring information to a management apparatus via a network, the method comprising:

storing in a storage unit information of a sending destination for transmitting monitoring information to the management apparatus;

receiving an inquiry from the monitoring apparatus as to whether or not the image forming apparatus includes a function for changing the information of the sending destination;

sending a response indicating that the image forming apparatus includes a function for changing the information of the sending destination in accordance with the inquiry when it is determined that the image forming apparatus includes the function for changing the information of the sending destination and no monitoring is performed by an external device different from the monitoring apparatus;

sending a response indicating that the image forming apparatus includes no function for changing the information of the sending destination in accordance with the inquiry when the image forming apparatus includes no function for changing the information of the sending destination or the monitoring is performed by the external device;

changing the information of the sending destination to the monitoring apparatus in accordance with a reception of change information for changing the sending destination of the monitoring information to the monitoring apparatus, having received the response indicating that the image forming apparatus includes the function for changing the information of the sending destination; and transmitting the monitoring information to the monitoring apparatus based on the changed information of the sending destination.

\* \* \* \* \*